US012694627B2

(12) United States Patent
Ökvist et al.

(10) Patent No.: US 12,694,627 B2
(45) Date of Patent: Jul. 28, 2026

(54) EXTENDED REALITY RENDERING DEVICE PRIORITIZING WHICH AVATAR AND/OR VIRTUAL OBJECT TO RENDER RESPONSIVE TO RENDERING PRIORITY PREFERENCES

(71) Applicant: Telefonaktiebolaget LM Ericsson (publ), Stockholm (SE)

(72) Inventors: Peter Ökvist, Luleå (SE); Tommy Arngren, Södra Sunderbyn (SE); Andreas Kristensson, Södra Sandby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 146 days.

(21) Appl. No.: 18/561,940

(22) PCT Filed: May 19, 2021

(86) PCT No.: PCT/EP2021/063342
§ 371 (c)(1),
(2) Date: Nov. 17, 2023

(87) PCT Pub. No.: WO2022/242855
PCT Pub. Date: Nov. 24, 2022

(65) Prior Publication Data
US 2024/0242449 A1     Jul. 18, 2024

(51) Int. Cl.
*G06T 19/00* (2011.01)
*G06T 13/40* (2011.01)
(52) U.S. Cl.
CPC ............ *G06T 19/006* (2013.01); *G06T 13/40* (2013.01)
(58) Field of Classification Search
CPC .............................. G06T 19/006; G06T 13/40
See application file for complete search history.

(56) References Cited

U.S. PATENT DOCUMENTS 8,276,080 B2     9/2012  Tatsubori
10,127,290 B1   11/2018  Armstrong et al.
(Continued)

FOREIGN PATENT DOCUMENTS

EP     0942397 A2     9/1999
EP     0978026 A2     2/2000
(Continued)

OTHER PUBLICATIONS

International Search Report and Written Opinion of the International Searching Authority, PCT/EP2021/063342, mailed May 11, 2022, 24 pages.
(Continued)

*Primary Examiner* — Amit Chatly
(74) *Attorney, Agent, or Firm* — Sage Patent Group

(57) ABSTRACT

An XR rendering device renders an immersive XR environment on a display device for viewing by a participant among a group of participants who have associated avatars representing the participants which are rendered in the immersive XR environment. The XR rendering device obtains a rendering priority preference defined for a first participant among the group of participants. The rendering priority preference indicates a part of the avatar representing the first participant and/or a virtual object associated with the avatar that is preferred to be prioritized for rendering. When rendering in the immersive XR environment parts of the avatar representing the first participant and/or a plurality of virtual objects which includes the virtual object, the XR rendering device prioritizes rendering of the part of the avatar representing the first participant and/or the virtual object responsive to the preference indicated by the rendering priority preference.

20 Claims, 5 Drawing Sheets

(56) References Cited

U.S. PATENT DOCUMENTS

| | | | |
|---|---|---|---|
| 10,909,757 | B2 | 2/2021 | Childress et al. |
| 10,909,767 | B1 | 2/2021 | Childress et al. |
| 11,010,129 | B1 | 5/2021 | Rakshit |
| 11,012,482 | B1 | 5/2021 | Yerli |
| 11,068,046 | B1 | 7/2021 | Zavesky et al. |
| 2005/0080900 | A1 | 4/2005 | Culbertson et al. |
| 2009/0100035 | A1 | 4/2009 | Cradick et al. |
| 2009/0109229 | A1 | 4/2009 | Hamilton, II et al. |
| 2010/0070884 | A1 | 3/2010 | Bromenshenkel et al. |
| 2010/0121810 | A1 | 5/2010 | Bromenshenkel et al. |
| 2010/0122182 | A1 | 5/2010 | Bromenshenkel et al. |
| 2011/0029897 | A1 | 2/2011 | Russell |
| 2011/0055734 | A1 | 3/2011 | Borst et al. |
| 2012/0188233 | A1* | 7/2012 | Shuster ................... G06T 15/20 |
| | | | 345/419 |
| 2013/0201104 | A1 | 8/2013 | Ptucha et al. |
| 2013/0257752 | A1 | 10/2013 | Tripathi et al. |
| 2014/0022332 | A1 | 1/2014 | Wang et al. |
| 2014/0210857 | A1 | 7/2014 | Liu et al. |
| 2014/0253667 | A1 | 9/2014 | Tian |
| 2014/0361977 | A1 | 12/2014 | Stafford et al. |
| 2016/0026253 | A1 | 1/2016 | Bradski et al. |
| 2016/0180591 | A1 | 6/2016 | Shiu et al. |
| 2016/0217623 | A1 | 7/2016 | Singh |
| 2016/0359941 | A1 | 12/2016 | Kvaal et al. |
| 2017/0039750 | A1 | 2/2017 | Tong et al. |
| 2017/0099462 | A1 | 4/2017 | Tangeland et al. |
| 2017/0231532 | A1 | 8/2017 | Chakravarty et al. |
| 2018/0063206 | A1 | 3/2018 | Faulkner |
| 2018/0247453 | A1 | 8/2018 | Nakashima et al. |
| 2018/0295158 | A1 | 10/2018 | Faulkner |
| 2019/0025913 | A1 | 1/2019 | Cheng et al. |
| 2019/0026589 | A1 | 1/2019 | Sugihara et al. |
| 2020/0066049 | A1 | 2/2020 | Sun et al. |
| 2020/0289941 | A1 | 9/2020 | Khan et al. |
| 2020/0349768 | A1 | 11/2020 | Zavesky et al. |
| 2021/0336784 | A1 | 10/2021 | Athlur et al. |
| 2022/0400244 | A1 | 12/2022 | Schaefer et al. |
| 2024/0257434 | A1* | 8/2024 | Ökvist ................... A63F 13/79 |

FOREIGN PATENT DOCUMENTS

| | | |
|---|---|---|
| EP | 2015200 A1 | 1/2009 |
| JP | 5294612 B2 | 9/2013 |
| WO | 2022008075 A1 | 1/2022 |
| WO | 2022242854 A1 | 11/2022 |

OTHER PUBLICATIONS

Que, Ying Peng et al., "Rendering Models for Immersive Voice Communications within Distributed Virtual Environment," TENCON 2005: 2005 IEEE Region 10 Conference, Nov. 21-24, 2005, Melbourne, Australia, 6 pages.

Rubin, Peter (Wired), "Facebook Can Make VR Avatars Look—and Move—Exactly Like You," Mar. 13, 2019; Downloaded from the Internet at: https://www.wired.com/story/facebook-oculus-codec-avatars-vr/, 9 pages.

International Search Report and Written Opinion of the International Searching Authority, PCT/EP2021/063340, mailed Feb. 11, 2022, 13 pages.

* cited by examiner

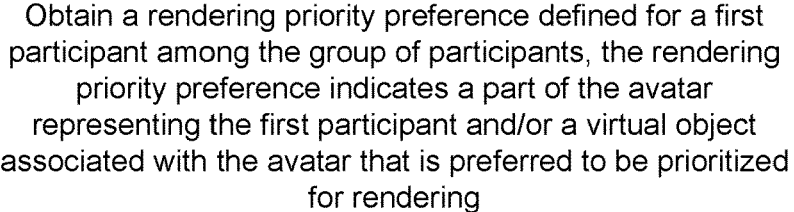

Obtain a rendering priority preference defined for a first participant among the group of participants, the rendering priority preference indicates a part of the avatar representing the first participant and/or a virtual object associated with the avatar that is preferred to be prioritized for rendering ⎯ 400

When rendering in the immersive XR environment a plurality of parts of the avatar representing the first participant and/or a plurality of virtual objects which includes the virtual object associated with the avatar, prioritize rendering of the part of the avatar representing the first participant and/or the virtual object associated with the avatar responsive to the preference indicated by the rendering priority preference ⎯ 402

Figure 4

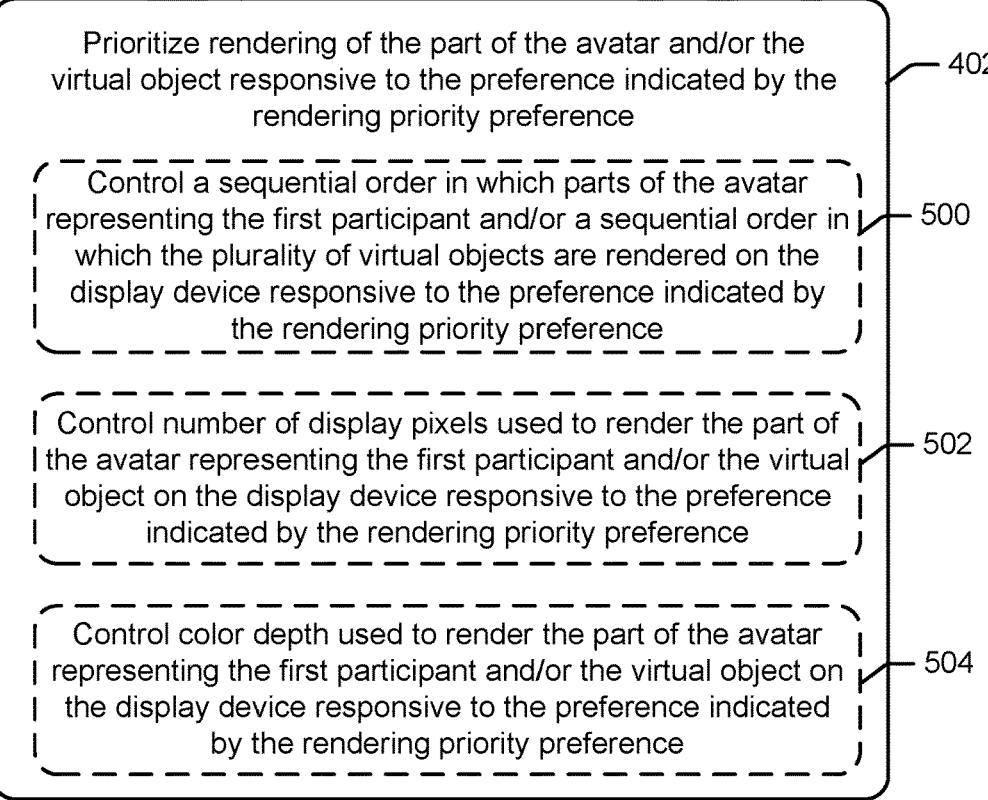

Prioritize rendering of the part of the avatar and/or the virtual object responsive to the preference indicated by the rendering priority preference ⎯ 402

Control a sequential order in which parts of the avatar representing the first participant and/or a sequential order in which the plurality of virtual objects are rendered on the display device responsive to the preference indicated by the rendering priority preference ⎯ 500

Control number of display pixels used to render the part of the avatar representing the first participant and/or the virtual object on the display device responsive to the preference indicated by the rendering priority preference ⎯ 502

Control color depth used to render the part of the avatar representing the first participant and/or the virtual object on the display device responsive to the preference indicated by the rendering priority preference ⎯ 504

Figure 5

EXTENDED REALITY RENDERING DEVICE PRIORITIZING WHICH AVATAR AND/OR VIRTUAL OBJECT TO RENDER RESPONSIVE TO RENDERING PRIORITY PREFERENCES

CROSS REFERENCE TO RELATED APPLICATIONS

This application is a 35 U.S.C. § 371 national stage application of PCT International Application No. PCT/EP2021/063342 filed on May 19, 2021, the disclosure and content of which is incorporated by reference herein in its entirety.

TECHNICAL FIELD

The present disclosure relates to rendering extended reality (XR) environments and associated XR rendering devices, and more particularly to rendering avatars and virtual objects in immersive XR environments displayed on XR participant devices.

BACKGROUND

Immersive extended reality (XR) environments have been developed which provide a myriad of different types of user experiences for gaming, on-line meetings, co-creation of products, etc. Immersive XR environments (also referred to as "XR environments") include virtual reality (VR) environments where human users only see computer generated graphical renderings and include augmented reality (AR) environments where users see a combination of computer generated graphical renderings overlaid on a view of the physical real-world through, e.g., see-through display screens.

Immersive XR environments, such as gaming environments and meeting environments, are often configured to display computer generated avatars which represent poses of human users in the immersive XR environments. A user may select and customize an avatar, such as gender, clothing, hair style, etc. to represent that user for viewing by other users participating in the immersive XR environment. Example XR environment rendering devices include, without limitation, XR environment servers, XR headsets, gaming consoles, smartphones running an XR application, and tablet/laptop/desktop computers running an XR application. Oculus Quest is an example XR device and Google Glass is an example AR device.

Rendering an XR environment in real-time or near-real-time is computationally intensive and requires trade-offs between device responsiveness and the level of rendered graphical detail in order to not exceed the computational capacity (e.g., graphics processing unit (GPU) bandwidth) of the XR rendering device. Various technical approaches are directed to reducing or constraining the rendering computational requirements.

One approach is known as foveated rendering where an XR headset, XR glasses, etc. worn by an XR environment participant uses eye tracking to determine where the eyes are directed relative to an area of the XR environment displayed on a head-mounted display, and responsively controls rendering to provide higher resolution quality (e.g., image and/or video quality) for a sub-area of the area corresponding to the user's primary eye focus while reducing the resolution quality outside the user's primary eye focus, such as within the user's peripherical vision.

Another approach is referred to as fixed foveated rendering which controls rendered resolution quality based on a fixed focal orientation relative to the user's location within the XR environment.

Another approach assumes a fixed rendering depth, where virtual objects that are within a fixed distance of the user's location in the XR environment are rendered with higher resolution quality relative to other virtual objects that are location beyond the fixed distance. For example, spherical rendering (i.e. 360-sphere) operates to provide high resolution rendering within the sphere. The larger the distance (e.g., radius) of "the high-resolution sphere" that is defined around the user, the greater the computational rendering load that is required from the XR rendering device. Although spherical rendering can provide a high user quality of experience for panning, image-tracking and/or mobility, etc., the computational requirements can exceed the capacity of a commercially available or viable XR rendering device.

SUMMARY

Some embodiments disclosed herein are directed to an XR rendering device for rendering an immersive XR environment on a display device for viewing by a participant among a group of participants who have associated avatars, representing the participants, which are rendered in the immersive XR environment. The XR rendering device includes at least one processor and at least one memory storing instructions executable by the at least one processor to perform operations. The operations obtain a rendering priority preference defined for a first participant among the group of participants. The rendering priority preference indicates a part of the avatar representing the first participant and/or a virtual object associated with the avatar that is preferred to be prioritized for rendering. When rendering in the immersive XR environment a plurality of parts of the avatar representing the first participant and/or a plurality of virtual objects which includes the virtual object associated with the avatar, the operations prioritize rendering of the part of the avatar representing the first participant and/or the virtual object associated with the avatar responsive to the preference indicated by the rendering priority preference.

In one illustrative further embodiment, the operations prioritize rendering one of the following parts among the plurality of parts responsive to the preference indicated by the rendering priority preference: a face of the avatar; an article of virtual clothing worn by the avatar; and an accessory worn or carried by the avatar.

In one illustrative further embodiment, the operations prioritize rendering the virtual object relative to the other virtual objects based on the rendering priority preference defining one of the following conditions that is determined to be satisfied: the virtual object is touched by the avatar; the virtual object is within a threshold distance of the avatar, wherein the threshold distance is defined by the rendering priority preference; the virtual object is within a field of view (FOV) of a pose of the avatar in the immersive XR environment; the virtual object is within a threshold angular offset from the FOV of the pose of the avatar, wherein the threshold angular offset is defined by the rendering priority preference; the virtual object is predicted to become within the FOV of the pose of the avatar within a threshold time defined by the rendering priority preference; and the virtual object is predicted to become within the threshold distance of the avatar within the threshold time defined by the rendering priority preference.

Some other related embodiments are directed to a corresponding method by an XR rendering device for rendering an immersive XR environment on a display device for viewing by a participant among a group of participants who have associated avatars representing the participants which are rendered in the immersive XR environment. The method obtains a rendering priority preference defined for a first participant among the group of participants. The rendering priority preference indicates a part of the avatar representing the first participant and/or a virtual object associated with the avatar that is preferred to be prioritized for rendering. When rendering in the immersive XR environment a plurality of parts of the avatar representing the first participant and/or a plurality of virtual objects which includes the virtual object associated with the avatar, the method prioritizes rendering of the part of the avatar representing the first participant and/or the virtual object associated with the avatar responsive to the preference indicated by the rendering priority preference.

Some other related embodiments are directed to a corresponding computer program product including a non-transitory computer readable medium storing program code executable by at least one processor of an XR rendering device for performing operations to render an immersive XR environment on a display device for viewing by a participant among a group of participants who have associated avatars representing the participants which are rendered in the immersive XR environment. The operations obtain a rendering priority preference defined for a first participant among the group of participants. The rendering priority preference indicates a part of the avatar representing the first participant and/or a virtual object associated with the avatar that is preferred to be prioritized for rendering. When rendering in the immersive XR environment a plurality of parts of the avatar representing the first participant and/or a plurality of virtual objects which includes the virtual object associated with the avatar, the operations prioritize rendering of the part of the avatar representing the first participant and/or the virtual object associated with the avatar responsive to the preference indicated by the rendering priority preference Some embodiments disclosed herein are directed to an XR rendering device for rendering an immersive XR environment on a display device for viewing by a participant among a group of participants who have associated avatars representing the participants which are rendered in the immersive XR environment. The XR rendering device is configured to obtain a rendering priority preference defined for a first participant among the group of participants. The rendering priority preference indicates a part of the avatar representing the first participant and/or a virtual object associated with the avatar that is preferred to be prioritized for rendering. The XR rendering device is further configured, when rendering in the immersive XR environment a plurality of parts of the avatar representing the first participant and/or a plurality of virtual objects which includes the virtual object associated with the avatar, to prioritize rendering of the part of the avatar representing the first participant and/or the virtual object associated with the avatar responsive to the preference indicated by the rendering priority preference.

Some potential advantages of these embodiments is that they enable a first participant in an immersive XR environment to define what part of the avatar representing the first participant and/or what virtual object associated with the avatar is preferred by the first participant to be prioritized for rendering when being viewed by one or more other participants. For example, the first participant can define one or more rendering priority preference(s) that causes a face of the first participant's avatar, an article of virtual clothing (e.g., shirt, jacket, and/or sunglasses with textual and/or graphical logo, design etc.) worn by the first participant's avatar, and/or an accessory worn or carried by the first participant's avatar (e.g., weapon, backpack, handbag, golf bag, etc.) to be prioritized for rendering when viewed by one or more other participants who are proximately located to and have a FOV directed at the participant's avatar. In this manner, the first participant is able to define a preference that causes a second participant's device to render a designed or sponsored logo on a jacket worn by the avatar of the first participant with higher priority and greater picture/video quality relative to other rendered parts of the first participant's avatar, other avatars, and/or virtual objects. The second participant's device can therefore perform the rendering in the manner preferred by the first participant when there is insufficient processing bandwidth to keep up with a minimum acceptable XR environment rendering update rate and is forced to lower the rendering quality of at least some or all other parts of the first participant's avatar, other participant's avatars, and/or virtual objects.

Other XR rendering device, methods, and computer program products according to embodiments will be or become apparent to one with skill in the art upon review of the following drawings and detailed description. It is intended that all such additional XR rendering device, methods, and computer program products be included within this description and protected by the accompanying claims.

BRIEF DESCRIPTION OF THE DRAWINGS

Aspects of the present disclosure are illustrated by way of example and are not limited by the accompanying drawings. In the drawings:

FIGS. 4 through 7 are flowcharts of operations that can be performed by an XR rendering device in accordance with some embodiments of the present disclosure.

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of various present inventive concepts to those skilled in the art. It should also be noted that these embodiments are not mutually exclusive. Components from one embodiment may be tacitly assumed to be present/used in another embodiment.

Figure 1:
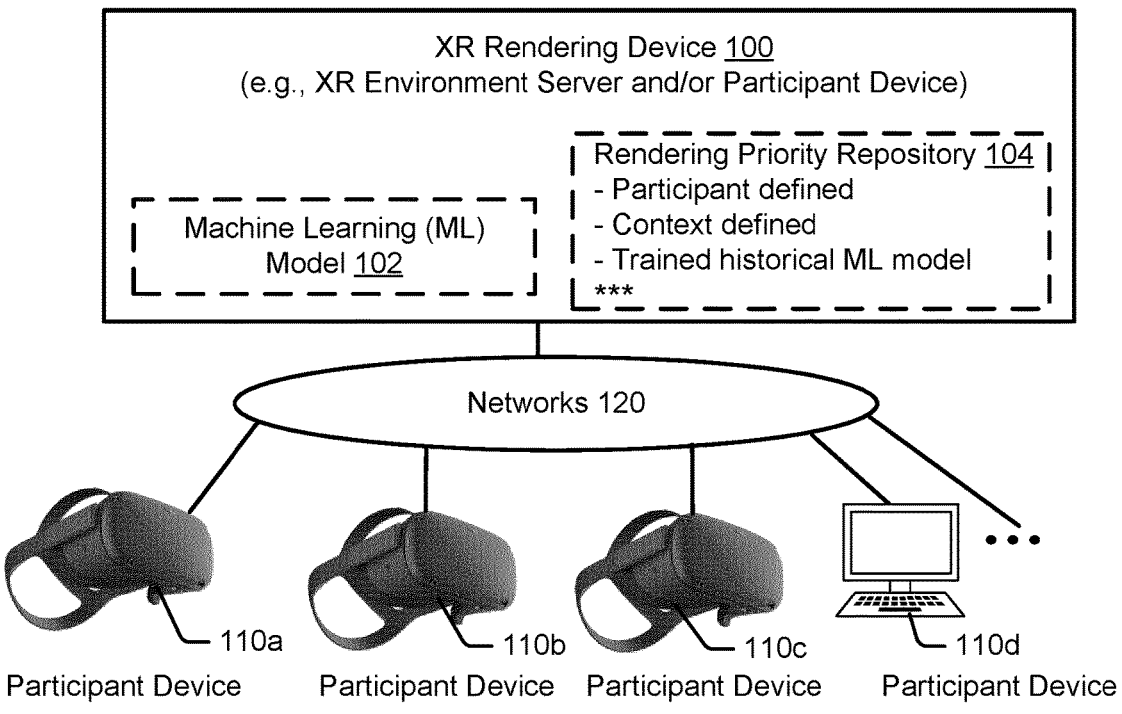
FIG. 1 illustrates an XR system that includes a plurality of participant devices that communicate through networks with an XR rendering device to operate in accordance with some embodiments of the present disclosure.

FIG. 1 illustrates an XR system that includes a plurality of participant devices 110a-d that communicate through networks 120 with an XR rendering device 100 to operate in accordance with some embodiments of the present disclosure. The XR rendering device 100 is configured to generate a graphical representation of an immersive XR environment (also called an "XR environment" for brevity) which is viewable from various perspectives of virtual poses of human participants in the XR environment through display screens of the various participant devices 110a-d. For example, the illustrated devices include VR headsets 110a-c which can be worn by participants to view and navigate through the XR environment, and a personal computer 110d which can be operated by a participant to view and navigate through the XR environment. The participants have associated avatars which are rendered in the XR environment to represent poses (e.g., location, body assembly orientation, etc.) of the participants relative to a coordinate system of the XR environment.

Although the XR rendering device 100 is illustrated in FIG. 1 and elsewhere as being separate from one or more of the participant devices, in some other embodiments the XR rendering device 100 is implemented as a component of one or more of the participant devices. For example, one of the participant devices may be configured to perform operations of the XR rendering device in a centralized manner controlling rendering for or by other ones of the participant devices. Alternatively, each of the participant devices may be configured to perform at least some of the operations of the XR rendering device in a distributed decentralized manner with coordinated communications being performed between the distributed XR rendering devices (e.g., between software instances of XR rendering devices).

Figure 2:
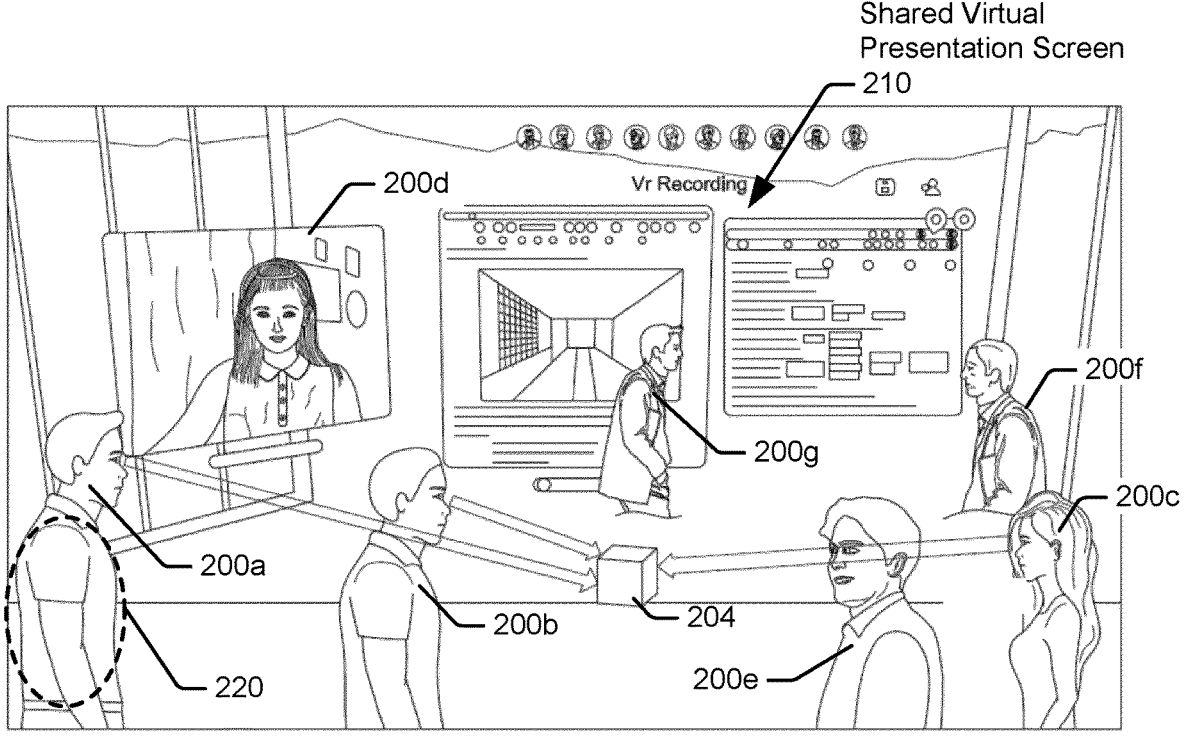
FIG. 2 illustrates an immersive XR environment with participants' avatars and a shared virtual presentation screen that are rendered with various poses within the XR environment, in accordance with some embodiments of the present disclosure.

FIG. 2 illustrates an immersive XR environment with avatars 200a-f that are graphically rendered with poses (e.g., at locations and with orientations) representing the present field of views (FOVs) of associated human participants in the XR environment. In the illustrated example, streaming video from a camera of the participant device 110d (personal computer) is displayed in a virtual screen 200d instead of rendering an avatar to represent the participant. A shared virtual presentation screen 210 is also graphically rendered at a location within the XR environment, and can display pictures and/or video that are being presented for viewing by the participants in the XR environment. A virtual object 204 is graphically rendered in the XR environment. The virtual object 204 may be graphically rendered in the XR environment with any shape or size, and can represent any type of object (e.g., table, chair, object on table, door, window, television or computer, virtual appliance, animated vehicle, animated animal, etc.). The virtual object 204 may represent a human participant in the XR environment (e.g., an avatar representation of a human participant) and may be animated to track movement and pose of the human participant within the XR environment responsive to movement input from the human participant and/or responsive to output of an eye-tracking device and/or head-tracking device.

In a multi-participant XR environment scenario such as illustrated in FIG. 2, a XR rendering device (e.g., an XR environment server or a participant device 110a) can become constrained by its processing bandwidth limitations when attempting to simultaneously render in real-time each of the participants' avatars, the virtual screen 200d, the shared virtual presentation screen 210, and the virtual objects including room surfaces and other parts of the XR environment.

A fundamental shortcoming for prioritizing whether and how any part of an XR environment should be prioritized for rendering is that the prioritization could be made in isolation by the viewing participant device, such as based on foveated rendering based on eye tracking. In another example, a first participant in an XR meeting with a group of other participants may be define a preference that causes the first participant's rending device (e.g., XR headset) to prioritize video frame rate over video quality, e.g., reducing video quality when necessary to maintain a minimum defined video frame rate.

Some potential advantages of various embodiments disclosed herein is that they enable a first participant in an immersive XR environment to define what part of the avatar representing the first participant and/or what virtual object associated with the avatar is preferred by the first participant to be prioritized for rendering when being viewed by one or more other participants. For example, the first participant can define one or more rendering priority preference(s) that causes a face of the first participant's avatar, an article of virtual clothing (e.g., shirt, jacket, and/or sunglasses with textual and/or graphical logo, design etc.) worn by the first participant's avatar, and/or an accessory worn or carried by the first participant's avatar (e.g., weapon, backpack, handbag, golf bag, etc.) to be prioritized for rendering when viewed by one or more other participants who are proximately located to and have a FOV directed at the participant's avatar. In this manner, the first participant is able to define a preference that causes a second participant's device to render a designed or sponsored logo on a jacket worn by the avatar of the first participant with higher priority and greater picture/video quality relative to other rendered parts of the first participant's avatar, other avatars, and/or virtual objects. The second participant's device can therefore perform the rendering in the manner preferred by the first participant when there is insufficient processing bandwidth to keep up with a minimum acceptable XR environment rendering update rate and is forced to lower the rendering quality of at least some or all other parts of the first participant's avatar, other participant's avatars, and/or virtual objects.

FIG. 4 is a flowchart of operations that can be performed by the XR rendering device 100 in accordance with some embodiments of the present disclosure.

Referring to FIGS. 1, 2, and 4, the XR rendering device 100 is configured for rendering an immersive XR environment on a display device (e.g., of one or more of participant devices 110a-110x in FIG. 1) for viewing by a participant among a group of participants who have associated avatars representing the participants which are rendered in the immersive XR environment. The XR rendering device 100 is configured to obtain 400 a rendering priority preference defined for a first participant (e.g., using participant device 110a) among the group of participants. The rendering priority preference indicates a part of the avatar (e.g., shirt 220 of avatar 200a) representing the first participant and/or a virtual object associated with the avatar (e.g., virtual object 204 in FOV of avatar 200a) that is preferred to be prioritized for rendering. The XR rendering device 100 is further configured, when rendering in the immersive XR environment a plurality of parts of the avatar (e.g., shirt 220 of avatar 200a) representing the first participant and/or a plurality of virtual objects which includes the virtual object associated with the avatar (e.g., virtual object 204 in FOV of avatar 200*a*), to prioritize 402 rendering of the part of the avatar (e.g., shirt 220 of avatar 200*a*) representing the first participant and/or the virtual object associated with the avatar (e.g., virtual object 204 in FOV of avatar 200*a*) responsive to the preference indicated by the rendering priority preference.

As was explained above, the participant devices may be any type of XR device. In some embodiments some or all of the participant devices are virtual reality (VR) headsets in which the wearers only see computer generated graphical renderings such as avatars, virtual objects, etc. In some other embodiments, some or all of the participant devices are augmented reality (AR) headsets (e.g., glasses) through which wearers see a combination of computer generated graphical renderings overlaid on a view of the physical real-world through, e.g., see-through display screens. In the case of an AR headset, the XR rendering device 100 can render graphical objects, textures, and color shading that is overlaid on the wearer's view of the physical real-world, such as a computer generated graphical rendering of clothing which is posed on a display screen to be viewed as overlaid on the real-world body of another participant and/or as a computer generated graphical rendering of a virtual object (e.g., weapon, handbag, hat, shield, scooter, etc.) which is posed on a display screen to be viewed as being carried by, connected to, or otherwise associated with the real-world body of the other participant.

In the example context of FIG. 2, the first participant corresponding to avatar 200*a* has defined a preference for the graphical details of the shirt 220 to be rendered with a higher priority than other parts of the avatar 200*a* (e.g., the face, hair, arms, etc.), other avatars, and/or virtual objects in the XR environment. Accordingly, in situations when the XR rendering device 100 becomes processing bandwidth limited with resulting degraded ability to provide rendering quality, the XR rendering device 100 operates to render the graphical details of the shirt 220 with a higher priority which can result in higher resolution quality being rendered for the shirt graphical details when viewed by other participants in the XR environment and can correspondingly result in lower resolution quality being rendered of other parts of the avatar 200*a*, other avatars, and/or virtual objects in the XR environment when viewed by the other participants.

In the example context of FIG. 1, the rendering priority preference is stored in a rendering priority data structure repository 104 with an association to an identity of the first participant. The XR rendering device can then query the rendering priority data structure repository 104 using the identity of the first participant to obtain the rendering priority preference of the first participant, such as will be described in further detail below regarding FIG. 3. Similarly, other participants can define one or more rendering priority preferences that are stored in the rendering priority data structure repository 104 with associations to corresponding identities of the other participants who request such rendering prioritization.

The prioritized rendering by the XR rendering device may control the order, graphical detail, color depth, and/or other operations and/or details of the rendering. In the example embodiment illustrated by the flowchart in FIG. 5, the operation to prioritize (402) rendering of the part of the avatar representing the first participant and/or the virtual object associated with the avatar responsive to the preference indicated by the rendering priority preference, includes at least one of:

a) controlling (500) a sequential order in which parts of the avatar representing the first participant and/or a sequential order in which the plurality of virtual objects are rendered on the display device responsive to the preference indicated by the rendering priority preference;

b) controlling (502) a number of display pixels used to render the part of the avatar representing the first participant and/or the virtual object on the display device responsive to the preference indicated by the rendering priority preference; and c) controlling (504) color depth used to render the part of the avatar representing the first participant and/or the virtual object on the display device responsive to the preference indicated by the rendering priority preference.

The rendering priority preference may, as explained above, identify a particular part of an avatar that is to be prioritized for rendering over other parts of avatar and/or over other avatars, and/or may identify a virtual object that is associated with the avatar which is to be prioritized for rendering over other virtual objects and/or avatars.

In some other embodiments, the rendering priority preference includes a parametric representation and/or a digital graphic representation of the part of the avatar representing the first participant and/or the virtual object associated with the avatar. The rendering priority preference may, for example, include a higher resolution representation of a shirt, a face, an accessory, etc. that is provided for rendering. The XR rendering device can then provide the parametric representation and/or the digital graphic representation of the part of the avatar and/or the virtual object to a participant device operated by a second participant for rendering on a display device. Thus, for example, a participant operating device 110*a* can associate a parametric representation and/or digital graphic representation of an object, such as a weapon, a shield, a face and/or a shirt with a rendering priority preference, which is then provided to another participant device 110*b* for use in rendering the object.

Figure 6:
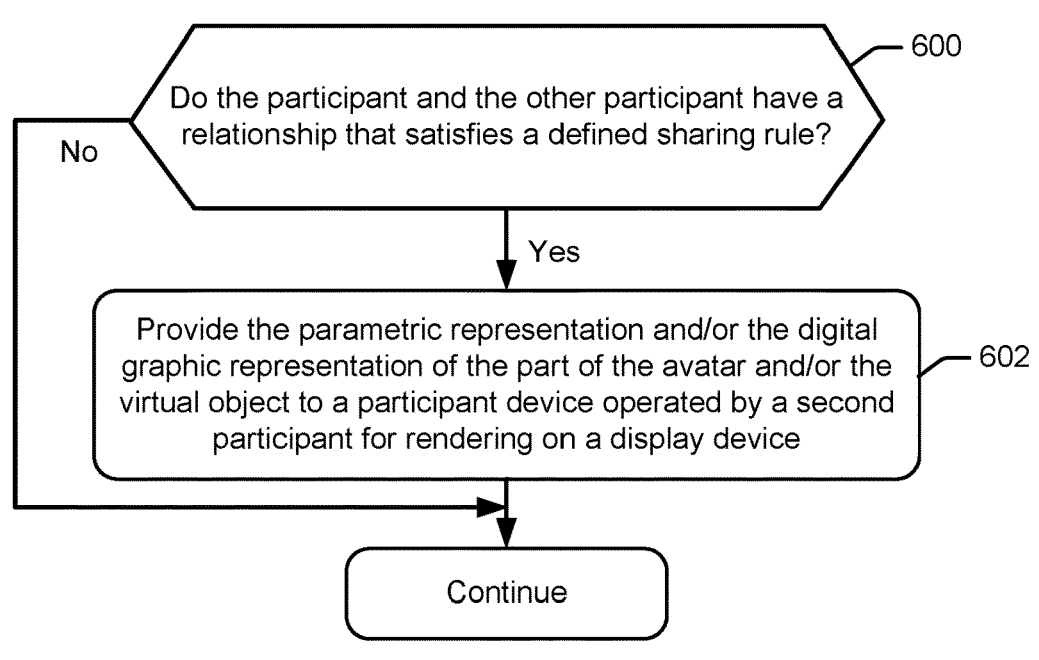

Whether the rendering priority preference for one participant is used to control rendering by another participant's device may depend upon whether the two participants have a defined relationship. In the scenario illustrated by the flowchart in FIG. 6, the XR rendering device can determine (600) whether the participant and the other participant have a relationship that satisfies a defined sharing rule. The operation to provide (602) the parametric representation and/or the digital graphic representation of the part of the avatar and/or the virtual object to the participant device operated by the second participant for rendering on the display device, is only performed responsive to determining (600) the participant and the other participant have a relationship that satisfies the defined sharing rule. The relationship may be defined based on defined or determined social relations, such as whether the participants are family, friends, and/or have interacted through XR environments (e.g., teammates in an XR game, co-meeting participants, exchanged electronic messages, conducted voice discussions, shared information, handed-off virtual objects between them, etc.) such as at least a threshold number of times in the past.

The rendering priority preference may be always active or may be selectively activated based on a condition defined by the participant, based on a defined context within the XR environment, and/or based on output of a historical machine learning model 102 that determines when and what type of rendering priority preference is to be used to prioritize rendering of parts of avatars and/or virtual objects. These and other rendering priority preferences and associated rendering operations are described in further detail below.

What the XR rendering device chooses to prioritize for rendering can be based on one or more defined conditions relating a virtual object to an avatar. In some embodiments, when rendering a plurality of virtual objects of an XR environment, the operations prioritize rendering a virtual object (e.g., 204 in FIG. 2) relative to the other virtual objects based on the rendering priority preference defining one of the following conditions that is determined to be satisfied:

a) the virtual object is touched by the avatar;

b) the virtual object is within a threshold distance of the avatar, wherein the threshold distance is defined by the rendering priority preference;

c) the virtual object is within a FOV of a pose of the avatar in the immersive XR environment, such a virtual object 204 being in the FOV of avatar 200*a;* d) the virtual object is within a threshold angular offset from the FOV of the pose of the avatar, wherein the threshold angular offset is defined by the rendering priority preference;

e) the virtual object is predicted to become within the FOV of the pose of the avatar within a threshold time defined by the rendering priority preference; and f) the virtual object is predicted to become within the threshold distance of the avatar within the threshold time defined by the rendering priority preference.

In some other embodiment, what the XR rendering device chooses to prioritize for rendering can be based on one or more defined conditions relating a virtual object to a group of avatars. The condition(s) when satisfied cause prioritized rendering of parts of an avatar and/or of a virtual object selected from among other virtual objects. The XR rendering device can when rendering in the immersive XR environment the plurality of parts of the avatar representing the first participant and/or the plurality of virtual objects which includes the virtual object associated with the avatar, operate to prioritize rendering the avatar relative to other avatars to be rendered and/or rendering the virtual object relative to the plurality of virtual objects to be rendered based on the rendering priority preference defining a condition that is determined to be satisfied. The rendering priority preference can define one or more of the following conditions that causes prioritization:

a) the avatar is concurrently in the FOVs of a threshold plural number of other avatars posed in the immersive XR environment, where the threshold plural number is defined by the rendering priority preference (e.g., avatar 200*a* is concurrently in the FOV of avatars 200*e*, 200*c*, and 200*f* of FIG. 2);

b) the virtual object is concurrently in the FOVs of the threshold plural number of other avatars posed in the immersive XR environment (e.g., virtual object 204 is concurrently in the FOV of avatars 200*a*, 200*b*, and 200*c* in FIG. 2);

c) the virtual object is concurrently touched by the threshold plural number of other avatars posed in the immersive XR environment;

d) the avatar is concurrently within a threshold distance of the threshold plural number of other avatars posed in the immersive XR environment, where the threshold distance is defined by the rendering priority preference; and e) the virtual object is concurrently within the threshold distance of the threshold plural number of other avatars posed in the immersive XR environment (e.g., virtual object 204 is concurrently within the threshold distance of, in same virtual room as, avatars 200*a-g* in FIG. 2).

The XR rendering device 100 shown in FIG. 1 may be part of a network server which is communicatively connected to a plurality of participant devices 110*a-d* operated by different participants in a group. The network server may be an XR environment server which operates to track the poses of the participants and virtual objects relative to a coordinate system of an XR environment. For example, the XR environment server may generate an immersive XR game or immersive XR meeting room and track poses of the participants and virtual objects which are transported by or present in the XR environment, and can enable the participants to interact with other participants and the virtual objects. The XR environment server may render some or all of the graphical representations of the participants' avatars and virtual objects for display on remote display devices of the participant devices 110*a-d*, and/or the participant devices 110*a-d* may receive input from the environment server which is used to render some or all of the graphical representations of the participants' avatars and virtual objects for local display.

When the XR rendering device 100 is part of a network server, the operation to obtain the rendering priority preference can receive the rendering priority preference from a first participant device operated by the first participant. Next the operation to prioritize rendering of the part of the avatar representing the first participant and/or the virtual object associated with the avatar responsive to the preference indicated by the rendering priority preference, operates to perform the prioritized rendering of the part of the avatar and/or the virtual object on a display device of a second participant device operated by a second participant among the group of participants.

The XR rendering device 100 shown in FIG. 1 may be part of a participant device operated by one of the participants who is represented by an avatar in the XR environment. An example operation for obtaining a rendering priority preference from one participant device to prioritize rendering of the avatar/object on a display device of another participant device, can then include receiving the rendering priority preference from a first participant device operated by the first participant. For example, participant device 110*b* can receive the rendering priority preference from participant device 110*a*. A first participant who is operating participant device 110*a* can define what part of an avatar (e.g., the shirt with a graphical logo or text phrase) which represents the first participant and/or a virtual object associated with the avatar (e.g., details of a weapon, shield, bicycle, skateboard, etc.) should be prioritized by another participant device 110*b* for rendering. The operation to prioritize rendering of the part of the avatar representing the first participant and/or the virtual object associated with the avatar responsive to the preference indicated by the rendering priority preference, operates to perform the prioritized rendering of the part of the avatar and/or the virtual object on a display device of the second participant device. Thus, the participant device 110*b* can prioritize rendering of the part of an avatar (e.g., the shirt with a graphical logo or text phrase) which represents the first participant and/or a virtual object associated with the avatar (e.g., details of a weapon, shield, bicycle, skateboard, scooter, etc.) over rendering of other parts of the avatar, over rendering of other avatars, and/or over rending of other objects which may be in the FOV of the second participant who is operating the participant device 110*b*.

Figure 3:
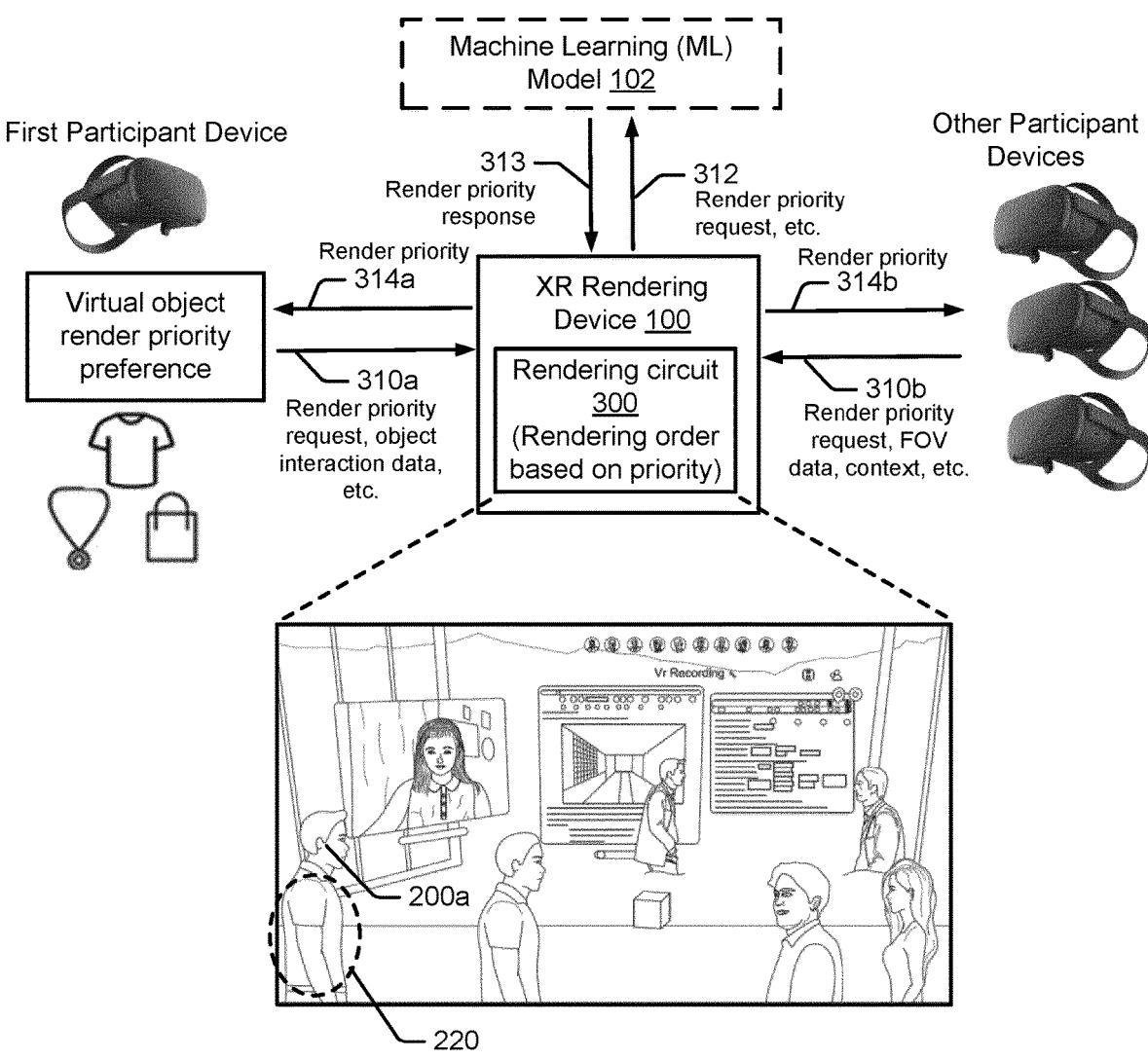
FIG. 3 is a further block diagram of an XR system which illustrates message flows and operations between a plurality of participant devices and an XR rendering device in accordance with some embodiments of the present disclosure.

FIG. 3 is a further block diagram of an XR system which illustrates message flows and operations between a plurality of participant devices and the XR rendering device 100 in accordance with some embodiments of the present disclosure.

Referring to FIG. 3, each of the participants can define a rendering priority preference that is to be used by other participant's devices to control prioritization of what is rendered. The rendering priority preference may be stored as an attribute of a user's profile in the participant's device. For example, a first participant can define a rendering priority preference which is provided 310a to the XR rendering device 100 and requests that rendering prioritization be given to a part of an avatar associated with the first participant, a virtual object associated with the first participant's avatar, and/or which provides a parametric representation and/or a digital graphic representation of a part of the avatar and/or a virtual object for rendering. Similarly, a second participant can define a rendering priority preference which is provided 310b to the XR rendering device 100 and requests that rendering prioritization be given to a part of an avatar associated with the second participant, a virtual object associated with the second participant's avatar, and/or which provides a parametric representation and/or a digital graphic representation of a part of the avatar and/or a virtual object for rendering. Other participants can similarly define rendering priority preferences which are provided to the acts or rendering devices 100 to control rendering related to the respective other participants. The rendering priority preferences provided by the various participants to the XR rendering device 100 may be stored in the rendering priority data structure repository 104 (FIG. 1) with an association to respective identities of the participants.

The XR rendering device 100 can control rendering of the XR environment by a rendering circuit 300 based on the rendering priority preferences that have been defined, and may provide rendered parametric representations of the XR environment to the participant devices for display. Alternatively or additionally, the XR rendering device 100 can use the rendering priority preferences that have been defined to provide priority commands 314a, 314b, etc. which control the rendering operations performed by the respective participant devices. For example, the XR rendering device 100 may use the rendering priority preference provided 310a by the first participant device to generate a message 314b that controls rendering priority by one or more other participant devices, such as by controlling: a sequential order in which parts of the avatar representing the first participant and/or a sequential order in which the plurality of virtual objects identified by the first participant are rendered on the display device responsive to the preference indicated by the respective rendering priority preference; a number of display pixels used to render the part of the avatar representing the first participant and/or the virtual object on the display device responsive to the preference indicated by the rendering priority preference; and/or a color depth used to render the part of the avatar representing the first participant and/or the virtual object on the display device responsive to the preference indicated by the rendering priority preference. Similarly, the XR rendering device 100 may use the rendering priority preference provided 310b by the second participant device to generate a message 314a that controls rendering priority by the first participant device.

For example, when the XR rendering device 100 determines that an avatar for the first participant has become within the FOV of an avatar for the second participant or is estimated to become within the FOV within a threshold time, the XR rendering device 100 can provide 314b the rendering priority preference for the first participant to the device of the second participant to control how prioritization is carried out when rendering of the first participant's avatar and/or a virtual object associated with the first participant.

The XR rendering device 100 may determine what to prioritize for rendering based on a ranking of requests indicated by the rendering priority preferences from the participant devices, e.g., first face, next accessory, next shirt, etc. For example, if a majority of the rendering priority preferences indicate that the highest priority for rendering is requested for the face of an avatar, followed by an accessory carried by the avatar (e.g., a shield), followed by a shirt worn by the avatar, etc., then the XR rendering device 100 can prioritize sequential rendering of the various items of each of the avatars according to the ranking.

In some embodiments, the XR rendering device uses machine learning (ML) to generate a rendering priority preference(s) based on learning related to, for example, what part of an avatar is focused on most (or re-viewed most often) by participants, what type(s) of virtual objects (e.g., clothing articles, weapons, etc.) are focused on most (or re-viewed most often) by participants, etc. In the example of FIG. 3, the XR rendering device 100 can provide context information in a request 312 to the ML model 102 to provide a priority instruction 313 for use by the XR rendering device 100 to control what parts of the avatars and/or virtual objects in the XR environment are prioritized for rendering for viewing by participant devices.

Figure 7:
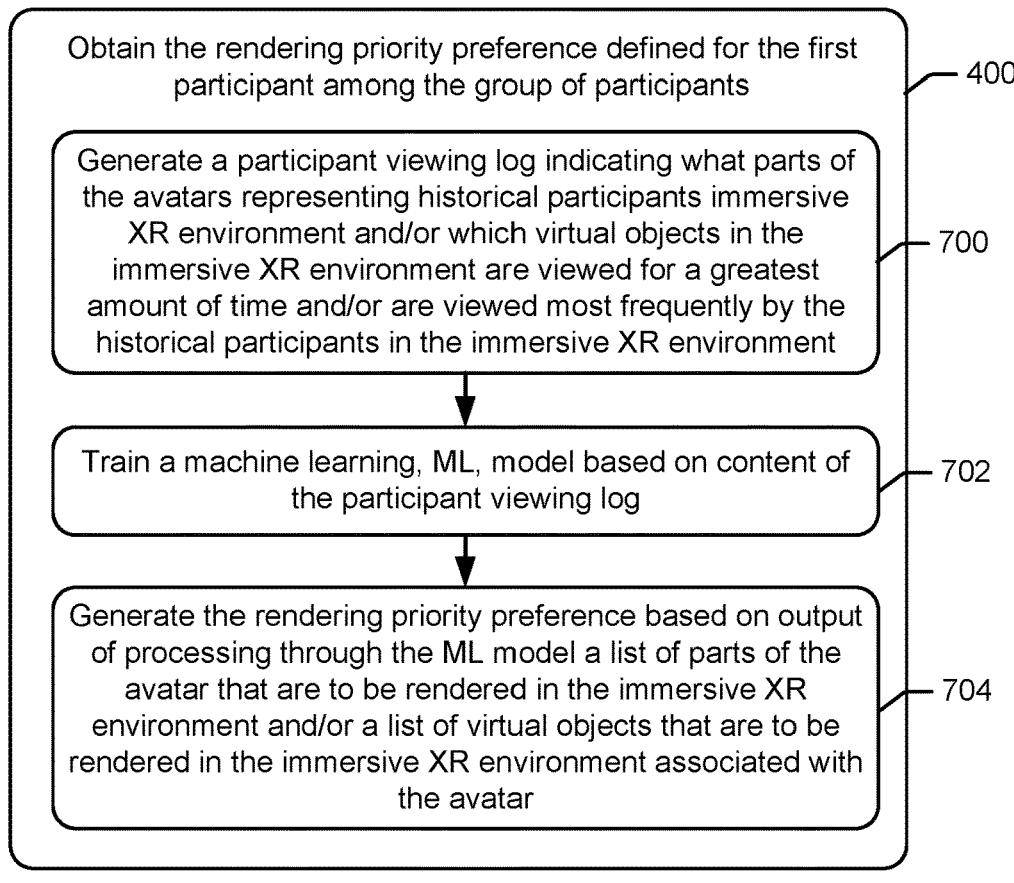

In example scenario illustrated by the flowchart in FIG. 7, the XR rendering device 100 obtains 400 (FIG. 4) the rendering priority preference defined for the first participant among the group of participants, by generating 700 a participant viewing log indicating what parts of the avatars representing historical participants immersive XR environment and/or which virtual objects in the immersive XR environment are viewed for a greatest amount of time and/or are viewed most frequently by the historical participants in the immersive XR environment. The XR rendering device 100 trains 702 a machine learning (ML) model 102 based on content of the participant viewing log. The operation to obtain 400 (FIG. 4) the rendering priority preference defined for the first participant among the group of participants, then includes generating 704 the rendering priority preference based on output of processing through the ML model 102 a list of parts of the avatar that are to be rendered in the immersive XR environment and/or a list of virtual objects that are to be rendered in the immersive XR environment associated with the avatar.

The XR rendering device 100 may programmatically decide what avatar parts and/or virtual objects to log as being most viewed based on FOV hold time during which a historical participant has maintained a FOV that is directed toward and within a threshold distance of a part of an avatar representing another participant and/or a virtual object in the immersive XR environment. In a further embodiment, the operation to generate 700 the participant viewing log, includes determining a FOV hold time during which a historical participant has maintained a FOV that is directed toward and within a threshold distance of a part of an avatar representing another participant and/or a virtual object in the immersive XR environment. When the FOV hold time satisfies a logging rule, operations add an identity of the part of the avatar and/or the virtual object to the participant viewing log.

Alternatively or additionally, the operation to generate 700 to generate the participant viewing log, to include measuring a FOV hold stability value indicating an amount of angular movement occurring between a center of the FOV of a historical participant toward and within a threshold distance of a part of an avatar representing another participant and/or a virtual object in the immersive XR environment. When the FOV hold stability value satisfies a logging rule, the operations add an identity of the part of the avatar and/or the virtual object to the participant viewing log.

The FOV hold time and/or the FOV hold stability value that is/are needed to satisfy the logging rule may be defined based on how many participants are located in the XR environment, based on how quickly participants are moving through an area of the XR environment, and/or based on how quickly participants can angularly scan their respective FOVs about in the XR environment. For example, the operations may set the logging rule to require a reduced FOV hold time and/or FOV hold stability value when a fewer number participants are present and require a greater FOV hold time and/or FOV hold stability value when a greater number of participants are present, or vice-versa. Also for example, the operations may require a reduced FOV hold time and/or FOV hold stability value based on faster angular rate FOV movements being measured or operationally capable of being performed by the participants in the XR environment, and conversely set greater required values based on slower angular rate FOV movements being measured or operationally capable of being performed by the participants in the XR environment, or vice-versa.

Example XR Rendering Device Configuration

Figure 8:
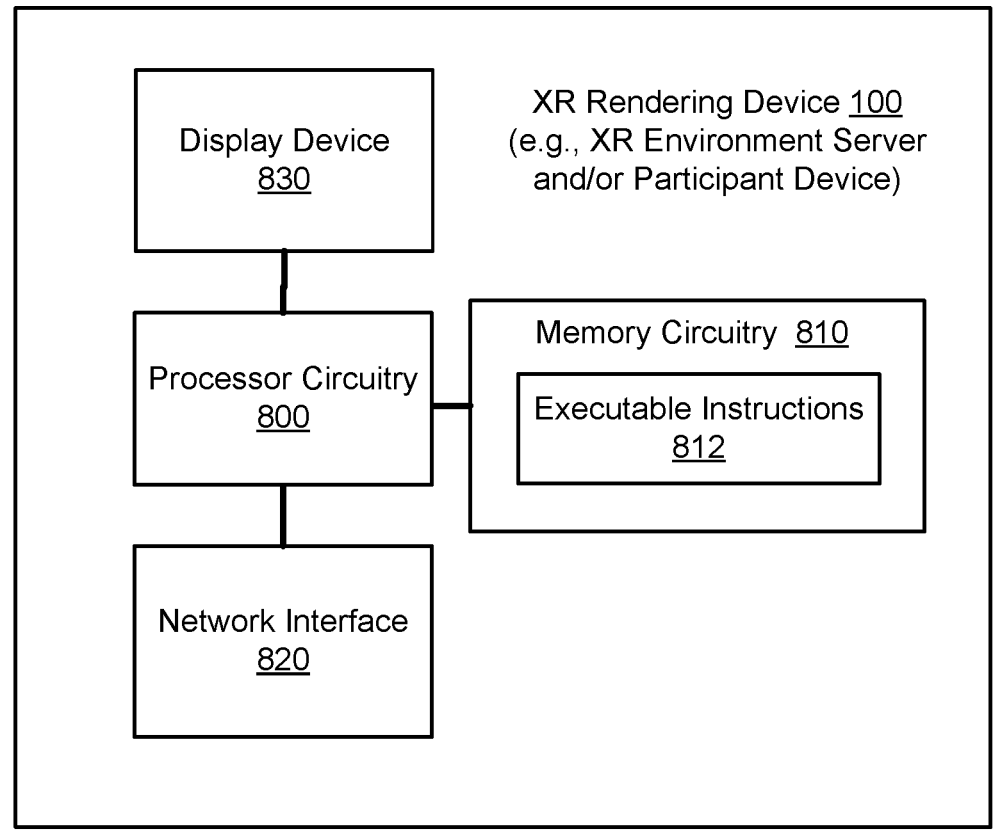
FIG. 8 is a block diagram of components of an XR rendering device that are configured to operate in accordance with some embodiments of the present disclosure.

FIG. 8 is a block diagram of components of an XR rendering device 100 that are configured to operate in accordance with some embodiments of the present disclosure. The XR rendering device 100 can include at least one processor circuit 800 (processor), at least one memory 810 (memory), at least one network interface 820 (network interface), and a display device 830. The processor 800 is operationally connected to these various components. The memory 810 stores executable instructions 812 that are executed by the processor 800 to perform operations. The processor 800 may include one or more data processing circuits, such as a general purpose and/or special purpose processor (e.g., microprocessor and/or digital signal processor), which may be collocated or distributed across one or more data networks. The processor 800 is configured to execute the instructions 812 in the memory 810, described below as a computer readable medium, to perform some or all of the operations and methods for one or more of the embodiments disclosed herein for an XR rendering device. As explained above, the XR rendering device may be separate from and communicatively connect to the participant devices, or may be at least partially integrated within one or more of the participant devices.

Further Definitions and Embodiments

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus, a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, micro-code, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the appended examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the following examples of embodiments and their equivalents, and shall not be restricted or limited by the foregoing detailed description.

The invention claimed is:

1. An extended reality, XR, rendering device for rendering an immersive XR environment on a display device for viewing by a participant among a group of participants who have associated avatars representing the participants which are rendered in the immersive XR environment, the XR rendering device comprising:

at least one processor; and at least one memory storing instructions executable by the at least one processor to perform operations to:

obtain a rendering priority preference defined for a first participant among the group of participants, the rendering priority preference indicates a part of the avatar representing the first participant and/or a virtual object associated with the avatar that is preferred to be prioritized for rendering; and when rendering in the immersive XR environment a plurality of parts of the avatar representing the first participant and/or a plurality of virtual objects which includes the virtual object associated with the avatar, prioritize rendering of the part of the avatar representing the first participant and/or the virtual object associated with the avatar responsive to the preference indicated by the rendering priority preference;

wherein the operations further comprise:

generate a participant viewing log indicating what parts of the avatars representing historical participants immersive XR environment and/or which virtual objects in the immersive XR environment are viewed for a greatest amount of time and/or are viewed most frequently by the historical participants in the immersive XR environment; and train a machine learning, ML, model based on content of the participant viewing log, and wherein the operation to obtain the rendering priority preference defined for the first participant among the group of participants, comprises to generate the rendering priority preference based on output of processing through the ML model a list of parts of the avatar that are to be rendered in the immersive XR environment and/or a list of virtual objects that are to be rendered in the immersive XR environment associated with the avatar.

2. The XR rendering device of claim 1, wherein when rendering in the immersive XR environment the plurality of parts of the avatar representing the first participant, the operations prioritize rendering one of the following parts among the plurality of parts responsive to the preference indicated by the rendering priority preference:

a face of the avatar;

an article of virtual clothing worn by the avatar; and an accessory worn or carried by the avatar.

3. The XR rendering device of claim 1, wherein when rendering in the immersive XR environment the plurality of virtual objects which includes the virtual object associated with the avatar, the operations prioritize rendering the virtual object relative to the virtual objects based on the rendering priority preference defining one of the following conditions that is determined to be satisfied:

the virtual object is touched by the avatar;

the virtual object is within a threshold distance of the avatar, wherein the threshold distance is defined by the rendering priority preference;

the virtual object is within a field of view, FOV, of a pose of the avatar in the immersive XR environment;

the virtual object is within a threshold angular offset from the FOV of the pose of the avatar, wherein the threshold angular offset is defined by the rendering priority preference;

the virtual object is predicted to become within the FOV of the pose of the avatar within a threshold time defined by the rendering priority preference; and the virtual object is predicted to become within the threshold distance of the avatar within the threshold time defined by the rendering priority preference.

4. The XR rendering device of claim 1, wherein when rendering in the immersive XR environment the plurality of parts of the avatar representing the first participant and/or the plurality of virtual objects which includes the virtual object associated with the avatar, the operations prioritize rendering the avatar relative to other avatars to be rendered and/or rendering the virtual object relative to the plurality of virtual objects to be rendered based on the rendering priority preference defining one of the following conditions that is determined to be satisfied:

the avatar is concurrently in the field of views, FOVs, of a threshold plural number of other avatars posed in the immersive XR environment, wherein the threshold plural number is defined by the rendering priority preference;

the virtual object is concurrently in the FOVs of the threshold plural number of other avatars posed in the immersive XR environment;

the virtual object is concurrently touched by the threshold plural number of other avatars posed in the immersive XR environment;

the avatar is concurrently within a threshold distance of the threshold plural number of other avatars posed in the immersive XR environment, wherein the threshold distance is defined by the rendering priority preference; and the virtual object is concurrently within the threshold distance of the threshold plural number of other avatars posed in the immersive XR environment.

5. The XR rendering device of claim 1, wherein:

the XR rendering device is part of a network server which is communicatively connected to a plurality of participant devices operated by different participants in the group;

the operation to obtain the rendering priority preference comprises to receive the rendering priority preference from a first participant device operated by the first participant; and the operation to prioritize rendering of the part of the avatar representing the first participant and/or the virtual object associated with the avatar responsive to the preference indicated by the rendering priority preference, operates to perform the prioritized rendering of the part of the avatar and/or the virtual object on a display device of a second participant device operated by a second participant among the group of participants.

6. The XR rendering device of claim 5, wherein:

the operation to prioritize rendering of the part of the avatar representing the first participant and/or the virtual object associated with the avatar responsive to the preference indicated by the rendering priority preference, further operates to perform the prioritized rendering of the part of the avatar and/or the virtual object on display devices of the plurality of the participant devices.

7. The XR rendering device of claim 1, wherein:

the XR rendering device is part of a second participant device which is operated by a second participant among the group of participants;

the operation to obtain the rendering priority preference comprises to receive the rendering priority preference from a first participant device operated by the first participant; and the operation to prioritize rendering of the part of the avatar representing the first participant and/or the virtual object associated with the avatar responsive to the preference indicated by the rendering priority preference, operates to perform the prioritized rendering of the part of the avatar and/or the virtual object on a display device of the second participant device.

8. An extended reality, XR, rendering device for rendering an immersive XR environment on a display device for viewing by a participant among a group of participants who have associated avatars representing the participants which are rendered in the immersive XR environment, the XR rendering device comprising:

at least one processor; and at least one memory storing instructions executable by the at least one processor to perform operations to:

obtain a rendering priority preference defined for a first participant among the group of participants, the rendering priority preference indicates a part of the avatar representing the first participant and/or a virtual object associated with the avatar that is preferred to be prioritized for rendering; and when rendering in the immersive XR environment a plurality of parts of the avatar representing the first participant and/or a plurality of virtual objects which includes the virtual object associated with the avatar, prioritize rendering of the part of the avatar representing the first participant and/or the virtual object associated with the avatar responsive to the preference indicated by the rendering priority preference;

wherein:

the XR rendering device is part of a network server which is communicatively connected to a plurality of participant devices operated by different participants in the group;

the operation to obtain the rendering priority preference comprises to receive the rendering priority preference from a first participant device operated by the first participant; and the operation to prioritize rendering of the part of the avatar representing the first participant and/or the virtual object associated with the avatar responsive to the preference indicated by the rendering priority preference, operates to perform the prioritized rendering of the part of the avatar and/or the virtual object on a display device of a second participant device operated by a second participant among the group of participants;

wherein the operation to prioritize rendering of the part of the avatar representing the first participant and/or the virtual object associated with the avatar responsive to the preference indicated by the rendering priority preference, comprises to control at least one of:

a sequential order in which parts of the avatar representing the first participant and/or a sequential order in which the plurality of virtual objects are rendered on the display device responsive to the preference indicated by the rendering priority preference;

number of display pixels used to render the part of the avatar representing the first participant and/or the virtual object on the display device responsive to the preference indicated by the rendering priority preference; and color depth used to render the part of the avatar representing the first participant and/or the virtual object on the display device responsive to the preference indicated by the rendering priority preference.

9. The XR rendering device of claim 1, wherein the rendering priority preference is stored in a rendering priority data structure repository associated with an identity of the first participant, and the operation to obtain the rendering priority preference comprises to:

query the rendering priority data structure repository using the identity of the first participant to obtain the rendering priority preference of the first participant.

10. The XR rendering device of claim 1, wherein the rendering priority preference includes a parametric representation and/or a digital graphic representation of the part of the avatar representing the first participant and/or the virtual object associated with the avatar, and the operations further comprise:

provide the parametric representation and/or the digital graphic representation of the part of the avatar and/or the virtual object to a participant device operated by a second participant for rendering on a display device.

11. The XR rendering device of claim 10, wherein the operations further comprise:

determine whether the participant and the other participant have a relationship that satisfies a defined sharing rule, wherein the operation to provide the parametric representation and/or the digital graphic representation of the part of the avatar and/or the virtual object to the participant device operated by the second participant for rendering on the display device, is only performed responsive to determining the participant and the other participant have a relationship that satisfies the defined sharing rule.

12. The XR rendering device of claim 1, wherein the operation to generate the participant viewing log, comprises to:

determine a FOV hold time during which a historical participant has maintained a FOV that is directed toward and within a threshold distance of a part of an avatar representing another participant and/or a virtual object in the immersive XR environment; and when the FOV hold time satisfies a logging rule, add an identity of the part of the avatar and/or the virtual object to the participant viewing log.

13. The XR rendering device of claim 1, wherein the operation to generate the participant viewing log, comprises to:

measure a FOV hold stability value indicating an amount of angular movement occurring between a center of the FOV of a historical participant toward and within a threshold distance of a part of an avatar representing another participant and/or a virtual object in the immersive XR environment; and when the FOV hold stability value satisfies a logging rule, add an identity of the part of the avatar and/or the virtual object to the participant viewing log.

14. A method by an extended reality, XR, rendering device for rendering an immersive XR environment on a display device for viewing by a participant among a group of participants who have associated avatars representing the participants which are rendered in the immersive XR environment, the method comprising:

obtaining a rendering priority preference defined for a first participant among the group of participants, the rendering priority preference indicates a part of the avatar representing the first participant and/or a virtual object associated with the avatar that is preferred to be prioritized for rendering;

when rendering in the immersive XR environment a plurality of parts of the avatar representing the first participant and/or a plurality of virtual objects which includes the virtual object associated with the avatar, prioritizing rendering of the part of the avatar representing the first participant and/or the virtual object associated with the avatar responsive to the preference indicated by the rendering priority preference;

generating a participant viewing log indicating what parts of the avatars representing historical participants immersive XR environment and/or which virtual objects in the immersive XR environment are viewed for a greatest amount of time and/or are viewed most frequently by the historical participants in the immersive XR environment; and training a machine learning, ML, model based on content of the participant viewing log, wherein rendering priority preference defined for the first participant among the group of participants, comprises generating the rendering priority preference based on output of processing through the ML model a list of parts of the avatar that are to be rendered in the immersive XR environment and/or a list of virtual objects that are to be rendered in the immersive XR environment associated with the avatar.

15. The method of claim 14, wherein when rendering in the immersive XR environment the plurality of parts of the avatar representing the first participant, the method prioritizing rendering one of the following parts among the plurality of parts responsive to the preference indicated by the rendering priority preference:

a face of the avatar;

an article of virtual clothing worn by the avatar; and an accessory worn or carried by the avatar.

16. The method of claim 14, wherein when rendering in the immersive XR environment the plurality of virtual objects which includes the virtual object associated with the avatar, the method prioritizing rendering the virtual object relative to the virtual objects based on the rendering priority preference defining one of the following conditions that is determined to be satisfied:

the virtual object is touched by the avatar;

the virtual object is within a threshold distance of the avatar, wherein the threshold distance is defined by the rendering priority preference;

the virtual object is within a field of view, FOV, of a pose of the avatar in the immersive XR environment;

the virtual object is within a threshold angular offset from the FOV of the pose of the avatar, wherein the threshold angular offset is defined by the rendering priority preference;

the virtual object is predicted to become within the FOV of the pose of the avatar within a threshold time defined by the rendering priority preference; and the virtual object is predicted to become within the threshold distance of the avatar within the threshold time defined by the rendering priority preference.

17. The method of claim 14, wherein when rendering in the immersive XR environment the plurality of parts of the avatar representing the first participant and/or the plurality of virtual objects which includes the virtual object associated with the avatar, the method prioritizing rendering the avatar relative to other avatars to be rendered and/or rendering the virtual object relative to the plurality of virtual objects to be rendered based on the rendering priority preference defining one of the following conditions that is determined to be satisfied:

the avatar is concurrently in the field of views, FOVs, of a threshold plural number of other avatars posed in the immersive XR environment, wherein the threshold plural number is defined by the rendering priority preference;

the virtual object is concurrently in the FOVs of the threshold plural number of other avatars posed in the immersive XR environment;

the virtual object is concurrently touched by the threshold plural number of other avatars posed in the immersive XR environment;

the avatar is concurrently within a threshold distance of the threshold plural number of other avatars posed in the immersive XR environment, wherein the threshold distance is defined by the rendering priority preference; and the virtual object is concurrently within the threshold distance of the threshold plural number of other avatars posed in the immersive XR environment.

18. The method of claim 14, wherein:

the XR rendering device is part of a network server which is communicatively connected to a plurality of participant devices operated by different participants in the group;

the method obtaining the rendering priority preference comprises receiving the rendering priority preference from a first participant device operated by the first participant; and the method prioritizing rendering of the part of the avatar representing the first participant and/or the virtual object associated with the avatar responsive to the preference indicated by the rendering priority preference, comprises performing the prioritized rendering of the part of the avatar and/or the virtual object on a display device of a second participant device operated by a second participant among the group of participants.

19. The method of claim 18, wherein the prioritizing rendering of the part of the avatar representing the first participant and/or the virtual object associated with the avatar responsive to the preference indicated by the rendering priority preference, comprises performing the prioritized rendering of the part of the avatar and/or the virtual object on display devices of the plurality of the participant devices.

20. The method of claim 14, wherein:

the XR rendering device is part of a second participant device which is operated by a second participant among the group of participants;

the method obtaining the rendering priority preference comprises receiving the rendering priority preference from a first participant device operated by the first participant; and the method prioritizing rendering of the part of the avatar representing the first participant and/or the virtual object associated with the avatar responsive to the preference indicated by the rendering priority preference, comprises performing the prioritized rendering of the part of the avatar and/or the virtual object on a display device of the second participant device.

* * * * *